United States Patent Office
3,509,185
Patented Apr. 28, 1970

3,509,185
PROCESS FOR THE MANUFACTURE OF
CARBONYL COMPOUNDS
Sidney Frank Schaeren, Bottmingen, and André Furlenmeier, Basel, Switzerland, assignors to Hoffmann-La Roche Inc., Nutley, N.J., a corporation of New Jersey
No Drawing. Filed Nov. 13, 1967, Ser. No. 682,565
Claims priority, application Switzerland, Nov. 25, 1966, 16,953/66
Int. Cl. C07c *167/12*
U.S. Cl. 260—397.3          19 Claims

ABSTRACT OF THE DISCLOSURE

A process for the preparation of carbonyl compounds from compounds having carbon-carbon unsaturation. The process comprises reduction of a hydroperoxide intermediate product, which is produced by ozonization of the unsaturated starting material, with a compound of the formula

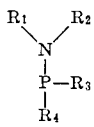

wherein each of $R_1$ and $R_2$ is independently lower alkyl or $R_1$ and $R_2$ taken together are oxa-lower alkylene or lower alkylene; and each of $R_3$ and $R_4$ is independently a moiety of the formula

DETAILED DESCRIPTION OF THE INVENTION

The novel process of this invention relates to an improved method for the preparation of carbonyl compounds. More particularly, this invention relates to methods for the preparation of carbonyl compounds from compounds having carbon-carbon unsaturation by a reaction procedure comprising ozonization of the starting material and subsequent reduction of the intermediate product formed by means of a phosphine reagent.

Carbonyl substituted compounds find wide utility in the chemical field either as such or as intermediates in the preparation of other valuable compounds. Thus, there has existed a desire to find a process which can be commercially adapted to produce such compounds.

A known process for the conversion of olefins and acetylenes into carbonyl compounds such as aldehydes and ketones, is a two-step process which comprises ozonization in the presence of hydroxyl-containing compounds (ozonolysis) and subsequent reduction of the intermediate product which is produced to obtain the desired aldehyde or ketone end product. The first step of the ozonization reaction proceeds by the following equation:

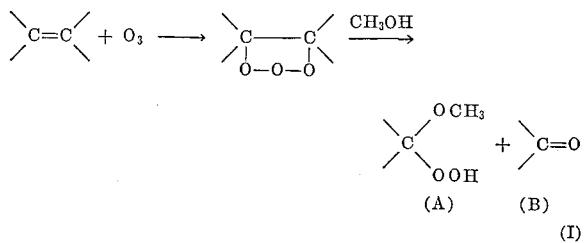

(I)

In the first step, for example, an olefin is reacted with ozone producing an ozonide, which in the presence of a hydroxyl-containing solvent yields a hydroperoxide, for example, hydroperoxide (A), and carbonyl compound (B). In the second step of the reaction, the hydroperoxide, for example, the methoxyhydroperoxide product (A), is reduced to the desired aldehyde or ketone. This reaction proceeds by the following equation:

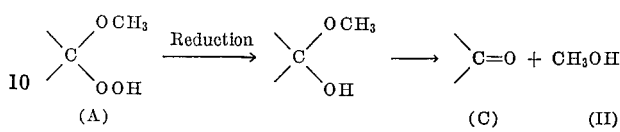

(II)

It should be noted that when the starting reactant is symmetrical with respect to the point of unsaturation, the carbonyl by-product (B) of reaction Step I will be identical with product (C) of reaction Step II. Thus, in this embodiment, Step II of the reaction results in increasing the yield of the desired end product. This reaction sequence, however, is especially useful in a preferred embodiment, where the starting reactant is asymmetric. In the preferred embodiment, a method is thus provided to produce a compound with the desired carbonyl structural configuration (C), which structure is never identical with the structure of by-product compound (B).

Known methods of reduction which have been applied to reactions exemplified by Equation II include reduction by means of a metal and acid, iodide reduction in acetic acid solution, reduction with complex metal hydrides, reduction by catalytic hydrogenation, reduction by means of aryl or alkyl phosphites in the presence of hydroxyl-containing solvents and reduction by means of triaryl or trialkyl phosphines. In accomplishing the reduction step, the known processes have serious limitations which make extremely difficult the commercial preparation of compounds utilizing them. Included within these limitations are the difficulties encountered in the initial phase of the reaction, which must be so conducted to avoid undesired peroxide rearrangements. Another disadvantage of the known methods of reduction is the insufficient activity of the known reducing agents at low temperatures to effectively produce the desired carbonyl product in adequate yields. As indicated above, it is known to employ alkyl or aryl phosphites in the presence of hydroxyl-containing compounds to reduce hydroperoxides obtained by ozonization of olefins. However, a further limitation which must be considered when utilizing this method of reduction lies in that it cannot be employed when it is also desired to recover the free carbonyl compounds without difficulty. The reason for the difficulty is experienced in separating the by-products produced from the phosphite reagent employed in the reduction reaction from the desired ketone or aldehyde end-product. Similarly, unsatisfactory results are obtained when trialkyl or triaryl phosphines are employed for the reduction step. Phosphine oxides which are thereby produced as by-products, are often difficult to remove from the reaction mixture. This seriously complicates recovery of the desired carbonyl product.

Accordingly, it is an object of this invention to provide a facile route for the preparation of carbonyl compounds.

Another object of this invention is to produce the desired carbonyl compounds in high yields.

A further object of this invention is to provide a process wherein the carbonyl end product is easily isolated from the reaction mixture.

Other objects and advantages of this invention will appear from the following embodiments and descriptions.

In accordance with the present invention, it has been found that the above objectives may be achieved by a process which comprises reducing the intermediate hydroperoxide product formed by the ozonization of compounds having carbon-carbon unsaturation with a phosphine of the general formula

wherein $R_1$ and $R_2$ is each independently lower alkyl; $R_1$ and $R_2$ when taken together is selected from the group consisting of oxo-lower alkylene and lower alkylene; and $R_3$ and $R_4$ is each independently a moiety of the formula

wherein $R_1$ and $R_2$ is as above defined.

As used herein, the term "lower alkyl" refers to both straight and branched chain hydrocarbon moieties such as methyl, ethyl, t-butyl and the like. The term "oxa-lower alkylene" refers to moieties such as $$-CH_2CH_2OCH_2CH_2-$$

in which case $R_1$ and $R_2$ taken together with the nitrogen atom to which they are joined in Formula III constitute morpholino. The term "lower alkylene" encompasses polymethylene groups such as tetramethylene and pentamethylene in which case $R_1$ and $R_2$ taken together with the nitrogen atom form, respectively, pyrrolidino and piperidino.

The present invention provides for the preparation of carbonyl compounds by a two-step process proceeding in accordance with Equations I and II. The first step comprises reacting unsaturated compounds with ozone under suitable conditions to produce an ozonide intermediate, which is further reacted in a hydroxyl-containing solvent to yield a hydroperoxide (A) and a carbonyl compound (B). The second step of this process uses the product (A) of the first step as a reactant, and comprises reducing the hydroperoxide to the desired aldehyde or ketone product with a phosphine of the general Formula III.

Exemplary of the carbon-carbon unsaturated starting compounds which may be employed in accordance with the teachings of this invention, are compounds characterized by having non-aromatic unsaturation such as olefinic and acetylenic unsaturation. Examples of compounds having non-aromatic unsaturation include those having acetylenic unsaturation, e.g., acetylene, methylacetylene, ethylacetylene, phenylacetylene, pentyne, hexyne, heptyne, etc.; those having olefinic unsaturation, ethylene, propylene, heptene, styrene, fumaric acid diethylester, 2β,3β-diacetoxy-5α-24-methyl-cholesta-7,22-dien-6-one,
2β,3β-diacetoxy-14α-hydroxy-5β-24-methyl-cholesta-7,22-dien-6-one,
20-formyl-4,17(20)-pregnadien-3-one and dihydroergosterone.

It is also contemplated to be within the scope of this invention to employ cyclic olefins such as cyclohexene, methylcyclohexene, cyclohexadiene, methylcyclohexadiene, indene, etc.

Also of interest as reactants are aromatic compounds including polynuclear aromatic compounds such as methylnapthalene, phenanthrene, acenaphthene and the like, where ozone attacks the carbon-carbon double bond having the highest double-bond character.

Preferred starting compounds are those having olefinic unsaturation.

The process of step I is carried out by known means, for example, by introducing an ozone-oxygen mixture to a solution of the starting material which has been dissolved in a hydroxyl-containing solvent. The reaction is suitably conducted at temperatures which range from 0° C. to −70° C. as may be convenient. However, it is preferred to operate this step of the process at temperatures which are generally between about −40° C. and −50° C. The rate of ozonization can be conveniently set at a range of between 5–500 millimoles per hour, depending on the scale of the experiment. The hydroperoxide product produced by step I is utilized for step II of the process upon removal of the residual ozone from the reaction solution.

Typical of the hydroxyl-containing solvents which can be suitably employed in the ozonization step are lower alkanols such as methanol, ethanol, t-butanol, isopropanol and the like.

In step II of this invention, the hydroperoxide product produced in the first step is reduced by a phosphine compound of the general Formula III. The phosphines used in accordance with the invention represent a known group of compounds. The compounds can be manufactured in a simple manner by reaction of the corresponding secondary amines with phosphorous trichloride. Preferred compounds of Formula III are those wherein $R_1$ and $R_2$ are lower alkyl groups containing from one to seven carbon atoms. Especially preferred compounds of Formula III are those wherein $R_1$ and $R_2$ are lower alkyl groups containing from one to four carbon atoms. Thus, compounds within this especially preferred group are, for example, tris(dimethylamino)-phosphine, tris(diethylamino)phosphine and tris(di-n-butylamino)-phosphine. A further preferred group of compounds of Formula III are those wherein $R_1$ and $R_2$ taken together are oxa-lower alkylene or lower alkylene. Thus, the tris(N-heterocyclic)-phosphine compounds within this further preferred group are, for example, tripiperidino-phosphine and trimorpholino-phosphine. The latter compound is especially preferred because of the excellent water-solubility of its reaction product.

The hydroperoxide intermediate which is formed in accordance with the present invention, is of the formula

wherein R is lower alkyl.

The reduction reaction by means of the phosphines of Formula III is conveniently carried out in the same solvent or solvent mixture in which the ozonolysis has previously taken place in step I. As indicated, the presence of hydroxyl-containing solvents is required for the ozonolysis reaction. Exemplary of suitable solvents, are lower alkanols such as methanol, ethanol, t-butanol, isopropanol and the like. The use of a solvent mixture comprising an alcohol (e.g., methanol or ethanol) and methylene chloride has been found to be particularly convenient.

The phosphoric acid triamides (phosphine oxides) which are by-products resulting from the reaction of the phosphine and the hydroperoxide are excellent solvents. For example, tris(dimethylamino)-phosphine oxide is an excellent aprotic solvent comparable in its qualities with such widely used solvents as dimethylformamide. The formation of these excellent solvents is highly advantageous when the carbonyl compounds obtained in accordance with this invention are to be further reacted, in which case the reaction mixture which is obtained can be used directly for the further reaction. The use of carbon tetrachloride as a solvent should be avoided since the phosphines of Formula III react violently with it and thus present a safety hazard.

The reduction reaction of this invention is suitably conducted at low temperatures between about −40° C. and −70° C. Especially good results are obtained when the reaction is conducted between about −50° C. and −60° C. and, accordingly, this is an especially preferred temperature range. Since the reaction between the hydroperoxide and the phosphine proceeds exothermically, cooling is necessary. During the addition of the phosphine the temperature of the reaction mixture should not be permitted to rise higher than −20° C.

The ratio of the reactants used for the reduction is not critical. While stoichiometric quantities of 1 mole of phosphine is required per mole of unsaturated starting material, it has been found advantageous to use a slight molar excess of the phosphine reagent in the order of from 2 to 10 percent. Moreover, a particular advantage of the instant process is the specificity in which the end product is produced. Excess phosphine which may be added to the reaction mixture to increase process efficiency does not detrimentally effect yields by further reduction of the desired aldehyde or ketone to alcohol.

After the hydroperoxide is converted to the corresponding carbonyl end product, the carbonyl compound may be isolated from the reaction mixture by any suitable separation method. One such method is to remove the excess phosphine from the reaction mixture by washing with dilute aqueous acid to convert the substituted phosphine to the corresponding ammonium salt and phosphoric acid. The by-product, to which the phosphine reagent which is employed to carry out the reduction is converted can be chosen, depending on whether the product of the reaction is water-soluble, or water-insoluble. If the product is water-soluble it is advantageous to choose a phosphine which gives a water-soluble phosphine oxide, such as tris(dimethylamino)-phosphine or trimorpholinophosphine. If, on the other hand, the product is water soluble the workup is simplified by choosing a phosphine which gives a water-insoluble phosphine oxide such as tris(di-n-butylamino)-phosphine or tripiperidinophosphine. Subsequent concentration of the reaction mixture by suitable evaporation means and further application of conventional purification methods as hereinafter illustrated, yield the pure end-product. Alternatively, the product may be retained in the solvent phase for shipment and subsequent use in that form.

Exemplary of the carbonyl compounds which may be formed in accordance with this invention, are, homophthalaldehyde from indene, glyoxylic acid ethyl ester from fumaric acid diethyl ester, n-heptanal from 1-octene, $(20S)$-$2\beta,3\beta$-diacetoxy-20-formyl-$5\alpha$-pregn-7-en-6-one from $2\beta,3\beta$-diacetoxy-$5\alpha$-24-methyl-cholesta-7,22-dien-6-one, $(20S)$-$2\beta,3\beta$-diacetoxy-20-formyl-$5\beta$-pregn-7-en-$14\alpha$-al-6-one from $2\beta,3\beta$-diacetoxy-$14\alpha$-hydroxy-$5\beta$-24-methyl-cholesta-7,22-dien-6-one.

For a more complete understanding of the nature and objects of this invention, reference may be had to the following examples which are given merely as further illustration of the invention and are not to be construed in a limiting sense. All temperatures are in degrees centigrade.

Example 1

29 g. (0.25 mol.) of indene are dissolved in a 1-liter flask equipped with thermometer, agitation means and an inlet gas diffusion plate, to which 800 ml. of absolute ethyl alcohol is added. The solution is ozonized at 0 to 5° by introduction of 110 liters per hour of an ozone-oxygen mixture containing 3 percent ozone, which is equivalent to 0.120 mol. of ozone per hour. The uptake of ozone is complete after 130 minutes. The end point can be determined by a brown-coloration which results when a potassium iodide solution is tested with the reaction mixture. Residual ozone is removed from the reaction solution by introduction of argon. The contents of the flask are then cooled to −50° with the help of a Dry-Ice/acetone bath and a solution of 43 g. of tris-(dimethylamino)-phosphine (0.263 mol.; 5 percent excess) in 50 ml. of methylene chloride is added dropwise over a 5 minute period. The temperature increased to −130° and the solution turned yellow. 10 ml. of glacial acetic acid are added in order to avoid any alkaline reaction during the reduction process since the resulting homophthalaldehyde is very unstable, it readily undergoes self-condensation. The reaction mixture is allowed to stand at room temperature for 30 minutes and is concentrated at 35° by means of a rotary evaporator and water-jet vacuum. The residue (110 g.) is then dissolved in 400 ml. of ether and shaken with small portions of 1-N hydrochloric acid in a separating funnel. The last portion must have a pH so as to maintain a congo-solution colored red (acid used about 100 ml.). The ether solution is then washed with five 50 ml. portions of water, subsequently dried over 50 g. of sodium sulfate and finally evaporated at 40° by means of a rotary evaporator and water-jet vacuum, 35 g. of homophthalaldehyde (0.236 mol.; 95 percent yield) is produced in the form of a yellow oil. For the purpose of identification, the homophthalaldehyde is reacted with aniline in glacial acetic acid to give N-phenylisoquinolinium acetate and the latter is isolated as the picrate which melts at 126° (from methyl alcohol).

Example 2

85 g. of fumaric acid diethyl ester (0.50 mol.) are dissolved in a 1.5 liter flask equipped with agitation means, thermometer and an inlet gas tube with a diffusion plate to which 500 ml. of methyl alcohol and 350 ml. of methylene chloride is added. The solution is cooled to −50° with a Dry Ice/acetone bath. The mixture is then ozonized for 3 hours by introduction of 200 liters per hour of an ozone-oxygen mixture containing 3 percent ozone (0.170 mol. of ozone per hour). In order to remove the excess ozone, argon is led through the reaction mixture for 15 minutes. A solution of 218 g. of tris(di-n-butylamino)-phosphine (0.525 mol.; 5 percent excess) in 100 ml. of methylene chloride is then added dropwise over a 15 minute period through a 250 ml. funnel while cooling with Dry Ice/acetone. During the addition, the temperature increased from −50° to −20°. The excess phosphine is then converted into di-n-butylacetamide and phosphorous acid by addition of 20 ml. of glacial acetic acid. After stirring at room temperature for 30 minutes, the mixture is concentrated at 40° by means of water-jet vacuum. The residue which is obtained contains glyoxylic acid ethyl ester which is further processed as follows:

The residue is treated with 200 ml. of methyl alcohol and boiled for 10 minutes in order to completely transform the resulting glyoxylic ester into the hemiacetal, 1-hydroxy-1-methoxy ethyl acetate. The methyl alcohol is again evaporated and the resulting residue (390 g.) is distilled employing a water-jet vacuum. With a bath temperature of 80–100°, the methoxy-hemiacetal of glyoxylic acid ethyl ester distills at a temperature of 58–62° (17 mm.). 94 g. (0.7 mol.) at a 70 percent yield of the product is produced. The by-product, tris(di-n-butylamino)-phosphine oxide, distills in high vacuum at 124° (0.4 mm.). For further identification, the corresponding 2,4-dinitrophenylhydrazone of glyoxylic acid ethyl ester was produced which had a melting point of 121–124° (from methyl alcohol).

Example 3

91.5 g. of fumaric acid di-n-butyl ester (0.40 mol.) are dissolved in a 1-liter flask equipped similarly to that used in Example 1, to which 400 ml. of methyl alcohol and 300 ml. of methylene chloride is added. The solution is cooled to −50° with a Dry Ice/acetone bath. The mixture is then ozonized for 3 hours with 170 liters per hour of an ozone-oxygen mixture containing 3 percent ozone (0.150 mol. of ozone per hour). Dissolved ozone colors the reaction solution blue as the reaction nears the end point. In order to remove excess ozone, the reaction mixture is bled with argon. A solution of 174 g. of tris(di-n-butylamino)-phosphine (0.42 mol., 5 percent excess) in 50 ml. of methylene chloride is then added dropwise over a 7–8 minute period through a 250 ml. funnel while cooling with Dry Ice/acetone at −50°. The temperature increases to −20°. Excess phosphine is converted into di-n-butylacetamide and phosphorous acid by addition of 30 ml. of glacial acetic acid. After stirring at room temperature for 30 minutes, the mixture is concentrated at 40° employing a water-jet vacuum. The residue obtained contains the n-butyl ester of glyoxylic acid. For purposes of identification, the residue is further processed as follows:

The residue is treated with 200 ml. of methyl alcohol and boiled for 10 minutes in order to completely transform the glyoxylic ester into the hemiacetal form, i.e., 1-hydroxy-1-methoxy-butyl acetate. The methyl alcohol is again evaporated off and the residue (335 g.) distilled by means of a water-jet vacuum. At an oil-bath temperature of 80–120°, the main fraction distills at 50° (14 mm.). 90 g. of methoxy-hemiacetal of glyoxylic acid n-butyl ester (0.56 mol.; 70 percent yield) $n_D^{30}=1.4160$ is obtained. For further identification, the corresponding thiosemicarbazone was produced which had a melting point of 159–161°. There was no melting point depression when a mixed melting point determination was made using an authentic sample prepared by the lead tetraacetate process from di-n-butyl tartrate.

Example 4

60 g. of phenanthrene (0.336 mol.) are dissolved in a 1-liter flask equipped as in Example 1, at room temperature to which a mixture of 450 ml. of methyl alcohol and 450 ml. of methylene chloride is added. The solution is cooled to −30° with a Dry Ice/acetone bath. Some phenanthrene precipitates; however, it is redissolved into solution on ozonization. The mixture is then ozonized with 0.155 mol. of ozone per hour (ozone-oxygen mixture; 3.1 percent ozone). After 130–140 minutes, the ozonization is complete. The reaction mixture is flushed with nitrogen for 5–10 minutes, then cooled to −50° and a solution of 60.5 g. of tris(dimethylamino)-phosphine (0.370 mol.; 10 percent excess) dissolved in 50 ml. of methylene chloride is added dropwise over a 5 minute period. The internal temperature rises to −20°, while the mixture is cooled with Dry Ice/acetone. The mixture is stirred at room temperature for an additional 45 minutes and concentrated by means of a rotary evaporator and water-jet vacuum at 40°. The residue is dissolved in 400 ml. of ether and shaken with small portions of 1-N hydrochloric acid in a separating funnel until a pH of 3–4 has been attained (acid used 80–90 ml.). The residue is then washed repeatedly five times with 50 ml. portions of water. The ether solution is dried over sodium sulfate and evaporated by means of a rotary evaporator and water-jet vacuum at 40°. The residual oily liquid is washed in a crystallizing dish with a small amount of ether and evacuated (water-jet) at room temperature for 15 hours. A hard pale brown crystal cake is obtained which is pulverized. 67 g. of 2,2′-diformyl-diphenyl is obtained which melts at 59–61° C. By recrystallization once from dioxan/water, the melting point rises to 62–63°. The corresponding bis-2,4-dinitrophenylhydrazone obtained for purposes of identification from the crude dialdehyde melts at 265–267° C. (decomposition).

EXAMPLE 5

53 g. of styrene (0.5 mol.) are dissolved in a 1-liter flask equipped as in Example 1, in which 350 ml. of methyl alcohol and 200 ml. of methylene chloride is added. The solution is cooled to −50° with a Dry Ice/acetone bath. While stirring vigorously, the clear solution is ozonized with a ozone-oxygen mixture containing 3 wt. percent ozone at a gas velocity of 170 liters per hour (0.150 mol. of $O_3$/hr.). Under these conditions, the reaction solution becomes blue (excess ozone) in 3 hours 25 minutes, corresponding to an ozone uptake of 0.5 mol. The excess ozone is removed by flushing of the reaction mixture with argon. 81.5 g. of tris(dimethylamino)-phosphine (0.50 mol.; no excess) dissolved in 100 ml. of methylene chloride is added dropwise to the reaction mixture over an 8 minute period while cooling at −50° with Dry Ice/acetone. The temperature of the reaction mixture increases from −50° to −18°. After warming to room temperature, the mixture is allowed to stand for 30 minutes and then concentrated by means of a rotary evaporator and water-jet vacuum at 40° yielding 160 g. of a pale yellowish mobile liquid. This liquid is then subjected to a steam-distillation. After 1.2 liters of water have been distilled, the distillate is extracted with three portions, each consisting of 100 ml. of methylene chloride. The methylene chloride solutions are combined and dried over sodium sulfate, filtered and evaporated. 48 g. of benzaldehyde (0.45 mol.) is produced at 90 percent yield, $n_D^{20}=1.5408$. The corresponding semicarbazone obtained therefrom melts at 224–225° C.

EXAMPLE 6

53 g. of styrene (0.50 mol.) are dissolved in a 1-liter flask equipped in a similar manner to that employed in Example 1, to which 300 ml. of methyl alcohol and 200 ml. of methylene chloride have been added. The solution is cooled to −50° with a Dry Ice/acetone bath. While stirring vigorously, the clear solution is ozonized by introduction of 200 liters per hour of an ozone-oxygen mixture (3 wt. percent ozone; 0.168 mol. of ozone per hour). After 3 hours, the reaction solution becomes blue due to the dissolved ozone. The excess ozone is removed by flushing the reaction mixture with nitrogen. At −50° and cooling with Dry Ice/acetone, 144.5 g. of tripiperidinophosphine (0.51 mol.; 2 percent excess) which is dissolved in 150 ml. of methylene chloride are added dropwise over a 12 minute period. The temperature increases from −50° to −30°. The mixture is allowed to achieve room temperature, then stirred for an additional 2½ hours and finally evaporated by means of a rotary evaporator and water-jet vacuum at 40°. The oily residue (230 g.) is subjected to a steam-distillation with 500 ml. of water in a 2-liter flask. The distillate is extracted a multiple number of times with methylene chloride and the combined extracts dried over sodium sulfate. Upon removal of the solvent, 48 g. of benzaldehyde is produced at a 90 percent yield. Vacuum distillation yields 42.5 g. of pure benzaldehyde (80 percent), $n_D^{20}=1.5421$.

EXAMPLE 7

53 g. of sytrene (0.50 mol.) are dissolved in a 1.5-liter flask equipped as in Example 1, to which 300 ml. of methyl alcohol and 200 ml. of methylene chloride have been added. The solution is cooled to −50° witha Dry Ice/acetone bath. While stirring vigorously, the clear solution is ozonized by introduction of 170 liters per hour of an ozone-oxygen mixture (3 wt. percent ozone at a rate of 0.150 mol./ozone per hour). After 3½ hours, the reaction solution becomes colored blue by dissolved ozone. The excess ozone is removed by flushing the reaction mixture with argon. At −50° and cooling with Dry Ice/acetone, a solution of 147 g. of trimorpholinophosphine (0.51 mol.; 2 percent excess), dissolved in 600 ml. of methylene chloride, is added dropwise over a 13 minute period. The temperature increases from −50° to −8°. After coming to room temperature, agitation of the solution is continued for 3 hours, whereupon the solution is concentrated in a 2-liter flask by means of a rotary evaporator and water-jet vacuum at 40° until precipitation occurs. After the addition of 500 ml. of water, the reaction mixture is subjected to a steam-distillation. The benzaldehyde which separates in the receiver is extracted with methylene chloride. After drying over sodium sulfate, the extract is evaporated at 40° yielding 49 g. of a residue which consists of practically pure benzaldehyde ($n_D^{20}=1.5425$).

EXAMPLE 8

53 g. of styrene (0.50 mol.) are dissolved in a 1.5-liter flask equipped as in Example 1, to which 300 ml. of methyl alcohol and 200 ml. of methylene chloride have been added. The solution is cooled to −50° with a Dry Ice/acetone bath. While stirring vigorously, the clear solution is ozonized by introduction of 170 liters per hour of an ozone-oxygen mixture (3 wt. percent ozone; 0.150 mol. of ozone per hour). After 3½ hours, the reaction solution turns a blue color as a result of the dissolved ozone. The excess ozone is removed by flushing the reaction mixture with argon. 147 g. of trimorpholinophosphine (0.51 mol.; 2 percent excess), dissolved in 600 ml. of methylene chloride, are added dropwise at −50° C. over a 13 minute period. The temperature increases from −55° to −80°. The mixture is stirred at room temperature for an additional 3 hours and then concentrated in a 2-liter flask by means of a rotary evaporator and water-jet vacuum at 40° bath-temperature until precipitation occurs. The precipitated material is taken up in ether and the ethereal solution is washed with several portions of water. After drying over sodium sulfate, the solution is evaporated and the residue subjected to a vacuum distillation. 46 g. of benzaldehyde is produced at a yield of 87 percent, B.P. 69–70° (19 mm. Hg), $n_D^{20}=1.5410$.

Example 9

31 g. of acenaphthene (0.20 mol.) are dissolved in a 1-liter flask equipped similarly to that employed in Example 1, to which 150 ml. of methyl alcohol and 350 ml. of methylene chloride have been added. The solution is cooled to −20° to −30° with a Dry Ice/acetone bath. The reaction mixture is ozonized with an ozone-oxygen mixture (170 liters/hr.) containing 3 weight percent ozone (0.150 mol. of $O_3$/hr.). The uptake of ozone is complete after 3 hours. The end point is detected by the brown-color which results upon testing with a potassium iodide solution. Excess ozone is removed by flushing with argon and the reaction mixture is then cooled to −50°. 68.5 g. of tris(dimethylamino)phosphine (0.42 mol.; 5 percent excess), dissolved in 100 ml. of methylene chloride, are added dropwise over an 8 minute period. The temperature increases from −52° to −20° notwithstanding vigorous cooling with Dry Ice/acetone. The mixture is allowed to stand for 30 minutes and warms to room temperature. The reaction mixture is then treated with 200 ml. of methylene chloride. This solution is treated with two 100 ml. portions of 30 percent acetic acid and three 70 ml. portions of water. The methylene chloride solution is then concentrated by means of a rotary evaporator and water-jet vacuum at 35° C. The residue is vigorously stirred in a 1-liter stirring flask with 500 ml. of 0.1-N hydrochloric acid while cooling with ice (cleavage of the acetal). After about 30 minutes, beige-colored granular crystals are produced. These are filtered off by means of suction, washed on the suction filter with three 100 ml. portions of water and subsequently dried over potassium hydroxide in water-jet vacuum. 25 g. (0.156 mol.), M.P. 70–80° of a crude product are produced which upon crystallization from n-heptane yield 16.3 g. (0.102 mol.) of 7-formyl-1-indanone in the form of yellow, fine needles which melt at 89–91°.

Example 10

40.8 g. of phenylacetylene (0.40 mol.) are dissolved in a 1-liter flask equipped as in Example 1, to which 400 ml. of absolute methyl alcohol have been added. The solution is cooled to −50° with a Dry Ice/acetone bath. The solution is ozonized at this temperature by introduction of an ozone-oxygen mixture (170 liters/hr.) containing 3 wt. percent ozone (0.150 mol. of ozone/hr.). The ozonization is complete after 2 hours and 50 minutes, as detected by the browning of a potassium iodide solution by the gas evolved from the flask. Excess ozone is removed from the reaction mixture by flushing with argon. After further cooling at −50°, a solution of 68.5 g. of tris(dimethylamino)-phosphine (0.42 mol.; 5 percent excess) in 50 ml. of methylene chloride is added dropwise over a 15 minute period. The internal temperature increases to −20° notwithstanding the continued cooling. 10 ml. of glacial acetic acid are then added and the mixture is allowed to stand at room temperature for 30 minutes. The initially colorless solution turns yellow during this period. The solution is then evaporated by means of a rotary evaporator and water-jet vacuum at 35°. The residue (152 g.) is dissolved in 400 ml. of ether and washed with six 50 ml. portions of water. The ether solution, dried over sodium sulfate, is completely concentrated as above. The brown oily residue (43 g.) is distilled. There are obtained 20 g. (37 percent) of phenylglyoxal in the form of a yellow oil, B.P. 48–50° (3 mm.), $n_D^{20}=1.5491$. The melting point of the corresponding bis-p-nitrophenyl-hydrazone is 298–301° C. IR: 1724 cm.$^{-1}$ (aldehyde), 1704 cm.$^{-1}$ (aryl ketone), 715 and 716 cm.$^{-1}$ (monosubst. benzene).

Example 11

33.7 g. of 1-octene (0.30 mol.) are dissolved in a 0.5-liter flask equipped similarly to that used in Example 1, to which 225 ml. of methyl alcohol have been added. The solution is cooled to −60° with a Dry Ice/acetone bath. The ozonization is carried out by introduction of an ozone-oxygen mixture (130 liters/hr.) containing 3 wt. percent ozone (0.10 mol. of $O_3$/hr.). After 3¼ hours, the reaction mixture becomes blue due to excess ozone which is then removed by introduction of argon. 49.0 g. (0.30 mol.) of tris(dimethylamino)-phosphine (without solvent) are added dropwise over a 15 minute period at a temperature of −50°; the temperature increases to −20°. The reaction mixture is allowed to stand at room temperature for 30 minutes and then evaporated at 35°. The residue (101 g.) is dissolved in 400 ml. of low-boiling petroleum ether and the solution is washed with small portions of 1-N hydrochloric acid such that the last portion causes a Congo solution to be a red color (acid used about 35 ml.). The mixture is then washed with three 50 ml. portions of water, dried over sodium sulfate and the solvent removed by means of a rotary evaporator. The residue (28 g.) is distilled. 22.3 g. (65 percent yield) of n-heptanal are obtained, which boils at 46–48° (14 mm.), $n_D^{20}=1.4120$. Melting point of the corresponding semicarbazone: 110° (from methanol).

Example 12

35.6 g. of 1-methylnaphthalene (0.25 mol.) are dissolved in a 1-liter flask equipped as in Example 1 to which 500 ml. of absolute methyl alcohol and 200 ml. of methylene chloride have been added. The solution is cooled to −25° with a Dry Ice/acetone bath. The ozonization is undertaken by introduction of an ozone-oxygen mixture (170 liters/hr.) containing 3 wt. percent ozone (0.150 mol. of ozone/hr.). The uptake of ozone is complete after 3½ hours which is evidenced by the mixture turning blue color. The excess ozone is removed by flushing with argon. 43 g. of tris(dimethylamino)-phosphine (0.262 mol.) in 50 ml. of methylene chloride are then added dropwise over a 6 minute period at a temperature of −70°. The temperature increases from −70° to −35°. Excess phosphine is decomposed by addition of 15 ml. of glacial acetic acid and the reaction mixture is brought to room temperature. The solvents are then evaporated at 35° by means of a water-jet vacuum and the residue is dissolved in 400 ml. of ether. The ether solution is shaken with small portions of 1-N hydrochloric acid until the last portion remains red when contacted with Congo solution. After washing with five 50 ml. poritons of water, the ether solution is dried over 30 g. of sodium sulfate and completely evaporated. 25 g. (0.17 mol., 68 percent yield) of 2-formyl-acetophenone are obtained as yellow oil. (The corresponding bis-2,4-dinitrophenylhydrazone melts at 137–140° from ethyl alcohol). Analysis $C_{21}H_{16}N_8O_8$. Calculated (percent): C, 49.61; H, 3.17; N, 22.04. Found (percent): C, 49.83; H, 3.45; N, 21.75.)

Example 13

4 g. (7.8 millimol) of 2β,3β-diacetoxy-5α-24-methyl-cholesta-7,22-dien-6-one are dissolved in a solution of 800 ml. of methylene chloride and 400 ml. of methanol. The solution is cooled to —60° and ozonized with an ozone-oxygen mixture for 70 minutes (amount of ozone used 9.3 millimol). 8 ml. of tris(dimethylamino)-phosphine are subsequently added dropwise and the reaction mixture is stirred at —60° for 30 minutes. The mixture is diluted with 2 liters of ether, washed, dried over sodium sulfate and concentrated. Upon crystallization from ether, 3 g. (20S)-2β,3β-diacetoxy-20-formyl-5α-pregn-7-en - 6 - one are obtained at 86.5 percent yield having a melting point of 212° C.

Example 14

2 g. (3.8 millimol) of 2β,3β-diacetoxy-14α-hydroxy-5β-24-methyl-cholesta-7,22-dien-6-one (M.P.=204–205°) are dissolved in a solution of 300 ml. of methylene chloride and 100 ml. of methanol. An ozone-oxygen mixture is introduced at —60° for 36 minutes. The amount of ozone consumed is 4.6 millimols. 4 ml. of tris(dimethylamino)-phosphine are then added, the mixture is stirred for 30 minutes at —60° and subsequently diluted with 1 liter of ether. The solution is washed with 0.5 N HCl, then washed free of the acid with water, dried over sodium sulfate and then concentrated. By crystallization from ether, 1.4 g. (80 percent) of (20S)-2β,3β-diacetoxy-20-formyl-5β-pregn-7-en-14α-al-6-one having a melting point of 205–207° C. is obtained.

Example 15

20 g. (49 millimol) of stigmastadienone are dissolved in a solution of 1200 ml. of methylene chloride and 300 ml. of methanol. 15 ml. of pyridine are added. The mixture is cooled to —60° and ozonized for 115 minutes with an ozone-oxygen mixture. The amount of ozone introduced is 54 millimol. 10 ml. of tris(dimethylamino)-phosphine are subsequently introduced and the mixture additionally stirred at —60° for 30 minutes. The reaction solution is then diluted with ether. It is then washed, dried over sodium sulfate and concentrated. After crystallization from an ether/isopropyl ether mixture, 13.8 g. of 20-formyl-pregn-4-en-3-one having a melting point of 156–158° C. are obtained in yields of 86.4 percent.

Example 16

30.7 millimol of 20-formyl-4,17(20)-pregnadien-3-one are dissolved in a solution of 400 ml. of methylene chloride and 400 ml. of methanol. 8 ml. of pyridine are added. The mixture is cooled to —60° and ozonized with an ozone-oxygen mixture for 70 minutes. The amount of ozone introduced is 33 millimol. 5 ml. of tris(dimethylamino)-phosphine are subsequently added, the mixture stirred at —60° for 30 minutes and then diluted with ether. The solution is washed, dried over sodium sulfate and concentrated. Upon crystallization from isopropyl ether, 7.8 g. of Δ⁴-androstene-3,17-dione are obtained at a yield of 88 percent.

Example 17

15 g. (37.9 millimol) of dihydroergosterone are dissolved in a solution of 1200 ml. of methylene chloride and 300 ml. of methanol. 7.5 ml. of pyridine are added and the mixture is cooled to —60°. The solution is then ozonized for 90 minutes with an ozone-oxygen mixture. The amount of ozone introduced is 42.7 millimol. 7.7 ml. of tris(dimethylamino)-phosphine are subsequently introduced dropwise and stirred at —60° for 30 minutes. The mixture is poured on ice, 2 liters of ether are added. The reaction mixture is successively washed with water, 0.5 N HCl and then with water again. The solution is dried over sodium sulfate and concentrated. Upon crystallization from ether, 8 g. of 20-formyl-pregn-4-en-3-one having a melting point of 156–160° C. are obtained at yields of 64.5 percent.

We claim:

1. A process for the preparation of carbonyl compounds which process comprises reacting a carbon-carbon unsaturated compound with ozone in the presence of a hydroxyl-containing solvent to produce a hydroperoxide intermediate and reducing said hydroperoxide intermediate with a phosphine of the formula

(III)

wherein $R_1$ and $R_2$ is each independently lower alkyl; $R_1$ and $R_2$ when taken together is selected from the group consisting of oxa-lower alkylene and lower alkylene; and $R_3$ and $R_4$ is each independently a moiety of the formula

wherein $R_1$ and $R_2$ is as above defined.

2. A process as in claim 1 in which the unsaturated compound is of the type having non-aromatic unsaturation.

3. A process as in claim 2, in which the unsaturated compound is 2β,3β-diacetoxy-14α-hydroxy-5β-24-methyl-cholesta-7,22-diene-6-one.

4. A process as in claim 2, in which the unsaturated compound is 2β,3β-diacetoxy-5α-24-methyl-cholesta-7,22-diene-6-one.

5. A process as in claim 2, in which the unsaturated compound is indene.

6. A process as in claim 2, in which the unsaturated compound is fumaric acid di-loweralkyl ester.

7. A process as in claim 2, in which the unsaturated compound is 1-octene.

8. A process as in claim 1 in which the unsaturated compound is one having a polynuclear aromatic ring structure.

9. A process as in claim 1 in which the phosphine reducing agent is tris(dimethylamino)-phosphine.

10. A process as in claim 1, in which the phosphine reducing agent is tris(di-n-butylamino)-phosphine.

11. A process as in claim 1, in which the phosphine reducing agent is trimorpholinophosphine.

12. A process as in claim 1, in which the phosphine reducing agent is tripiperidinophosphine.

13. A process for the preparation of carbonyl compounds which process comprises reducing a hydroperoxide compound of the formula

(IV)

wherein R is lower alkyl, with a phosphine of the formula

(III)

wherein $R_1$ and $R_2$ is each independently lower alkyl; $R_1$ and $R_2$ when taken together is selected from the group consisting of oxa-lower alkylene and lower alkylene; and $R_3$ and $R_4$ is each independently a moiety of the formula

wherein $R_1$ and $R_2$ is as defined as above.

14. A process as in claim 13 in which the phosphine reducing agent is tris(dimethylamino)-phosphine.

15. A process as in claim 13 in which the phosphine reducing agent is trimorpholinophosphine.

16. A process as in claim 1 for producing (20S)-2β,3β-diacetoxy-20-formyl - 5β - pregn-7-en-14α-al-6-one which comprises reacting 2β,3β-diacetoxy-14α-hydroxy-5β-24-methyl-cholesta-7,22-dien-6-one with ozone in the presence of a hydroxyl-containing solvent and then reducing the compound thus formed with trimorpholino-phosphine.

17. A process as in claim 1 for producing (20S)-2β, 3β-diacetoxy-20-formyl-5α-pregn-7-en-6-one which comprises reacting 2β,3β - diacetoxy-5α-24-methyl-cholesta-7, 22-dien-6-one with ozone in the presence of a hydroxyl-containing solvent and then reducing the compound thus formed with trimorpholino-phosphine.

18. A process as in claim 1 for producing 20-formyl-pregn-4-en-3-one which comprises reacting dihydroergosterone with ozone in the presence of a hydroxyl-containing solvent and then reducing the compound thus formed with trimorpholino-phosphine.

19. A process as in claim 1 in which the unsaturated compound is selected from the group consisting of aliphatic non-aromatic compounds, cyclic olefinic compounds and polynuclear compounds.

No references cited.

ELBERT L. ROBERTS, Primary Examiner

U.S. Cl. X.R.

260—397.4, 397.5, 397.45, 483, 590, 592, 599, 604